(12) United States Patent
Savolainen et al.

(10) Patent No.: US 10,476,996 B2
(45) Date of Patent: Nov. 12, 2019

(54) METHOD AND APPARATUS FOR MANAGING SENSOR INFORMATION

(75) Inventors: Teemu Savolainen, Nokia (FI);
Johanna Nieminen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 365 days.

(21) Appl. No.: 14/378,978

(22) PCT Filed: Feb. 15, 2012

(86) PCT No.: PCT/FI2012/050146
§ 371 (c)(1),
(2), (4) Date: Sep. 15, 2014

(87) PCT Pub. No.: WO2013/121076
PCT Pub. Date: Aug. 22, 2013

(65) Prior Publication Data
US 2015/0003475 A1   Jan. 1, 2015

(51) Int. Cl.
| | |
|---|---|
| G06F 7/00 | (2006.01) |
| H04L 12/28 | (2006.01) |
| H04W 4/00 | (2018.01) |
| H04L 29/08 | (2006.01) |

(52) U.S. Cl.
CPC ............ H04L 69/324 (2013.01); H04L 67/12 (2013.01)

(58) Field of Classification Search
CPC ....... H04W 40/246; H04W 40/20; G06F 7/00; G02B 23/2492; G02B 23/2469
USPC .......................................................... 370/474
See application file for complete search history.

(56) References Cited

U.S. PATENT DOCUMENTS

| | | | | |
|---|---|---|---|---|
| 8,228,954 B2* | 7/2012 | Thubert | .............. | H04W 40/246 370/328 |
| 8,386,433 B1* | 2/2013 | Kadayam | .......... | G06F 17/30174 707/646 |
| 2004/0249590 A1* | 12/2004 | Ota | ........................ | G01D 9/005 702/79 |
| 2006/0265397 A1* | 11/2006 | Bryan et al. | .................... | 707/10 |
| 2007/0226258 A1* | 9/2007 | Lambdin | ............ | G02B 23/2469 |
| 2008/0208367 A1* | 8/2008 | Koehler | ................... | G01D 3/08 700/19 |

(Continued)

FOREIGN PATENT DOCUMENTS

| | | |
|---|---|---|
| EP | 1434185 A1 | 6/2004 |
| KR | 20090089535 A | 8/2009 |

OTHER PUBLICATIONS

Yick, J. et al., Wireless sensor network survey, Computer Networks, vol. 52, 20080822 Elsevier Science Publishers B.V., Amsterdam, NL, pp. 2292-2330, doi:10.1016/j.comnet.2008.04.002.

*Primary Examiner* — Edan Orgad
*Assistant Examiner* — Vanneilian Lalchinthang
(74) *Attorney, Agent, or Firm* — Seppo Laine Oy (57) ABSTRACT

In accordance with an example embodiment of the present invention, there is provided an apparatus, comprising a receiver configured to receive sensor data, a transmitter configured to cause the sensor data, or data derived at least in part from the sensor data, to be transmitted, wherein the transmitter is further configured to transmit a metadata request to a first node. In some embodiments, the apparatus is a sensor node for inclusion in a sensor network, the sensor node capable of measuring at least one physical property to produce the sensor data.

20 Claims, 5 Drawing Sheets

(56) References Cited

U.S. PATENT DOCUMENTS

2009/0128412 A1\* 5/2009 Ryu et al. .................... 342/463
2011/0264663 A1\* 10/2011 Verkasalo ......... G06F 17/30867
                                                                                 707/740

\* cited by examiner

METHOD AND APPARATUS FOR MANAGING SENSOR INFORMATION

TECHNICAL FIELD

The present application relates generally to managing sensor information and contextual information in networks comprising sensor nodes.

BACKGROUND

Automated sensing can be employed to produce a large amount of data with little or no human intervention. Automated sensing can also be employed in environments where humans cannot readily work, for example inside nuclear reactors, in space or along the wings of commercial passenger aircraft. An automated sensing unit may be termed a sensor, wherein a sensor may be capable of sensing a physical property. A sensor may further be capable of communicating its sensing data periodically or as a continuous sensor data stream.

Sensor networks comprise a plurality of sensors, or sensor nodes, which may be connected to each other and/or a central node by means of wireless or wired communication links. A sensor network may be employed to sense temperature, pressure or other physical properties. For example, sensors may be installed in a combustion pressure vessel to monitor the temperature thereof and help produce an integrated understanding of operating conditions of the pressure vessel. Data from the sensor network may be visualized on a computer monitor in a control room, for example, where a shape of the pressure vessel may be coloured according to current temperature variations.

Continuous data from a plurality of sensors may facilitate understanding complex phenomena that may otherwise be difficult to grasp. For example in fusion energy research a large number of sensors can simultaneously measure properties of a plasma, such as temperature, pressure and magnetic field strength, which can be fed into a neural network to effect real-time management of plasma parameters to control plasma instabilities. In some cases, sensors may be dispersed over a large geographic area to provide information remotely, for example in a border region between sovereign countries where sensors may measure movement or detect people from their body heat with infrared detectors.

Sensors comprised in sensor networks may be powered by batteries, or alternatively by direct or indirect connection to a stable power supply. Where batteries are used, replacing the batteries becomes necessary to prevent sensor data from ceasing when the batteries run out. Power requirements of sensors may vary, in certain applications sensors can be designed to consume very little power by minituarization and employing low-power communication.

In some sensor networks, packet-switched communications are used to relay sensor data from sensors. In networks with relatively few sensors, circuit-switched communications may be employed. An example of the latter are closed-circuit television monitoring systems, where a limited number of cameras produce circuit-switched television monitoring data which may be observed in monitors in a local or remote guard post.

SUMMARY

Various aspects of examples of the invention are set out in the claims.

According to a first aspect of the present invention, there is provided an apparatus, comprising a receiver configured to receive sensor data, a transmitter configured to cause the sensor data, or data derived at least in part from the sensor data, to be transmitted, wherein the transmitter is further configured to transmit a metadata request to a first node. In some embodiments, the apparatus is a sensor node for inclusion in a sensor network, the sensor node capable of measuring at least one physical property to produce the sensor data.

According to a second aspect of the present invention, there is provided a method, comprising receiving sensor data in an apparatus, transmitting, from the apparatus, the sensor data, or data derived at least in part from the sensor data, and transmitting, from the apparatus, a metadata request to a first node According to further aspects of the present invention, there are provided computer programs configured to cause methods according to embodiments of the invention to be performed, when run.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1A:
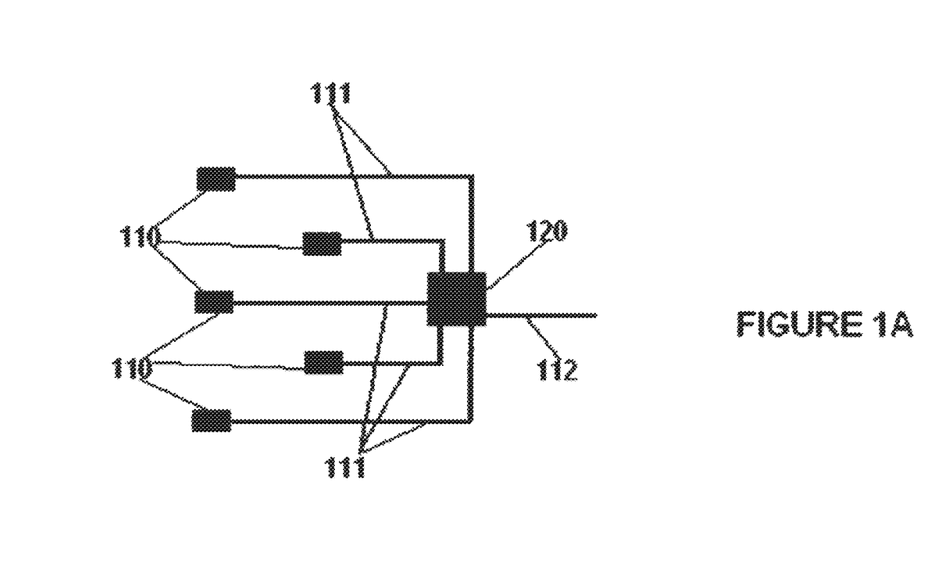
FIG. 1 illustrates examples of sensor network architectures according to example architectures capable of supporting some embodiments of the invention.
Figure 1B:
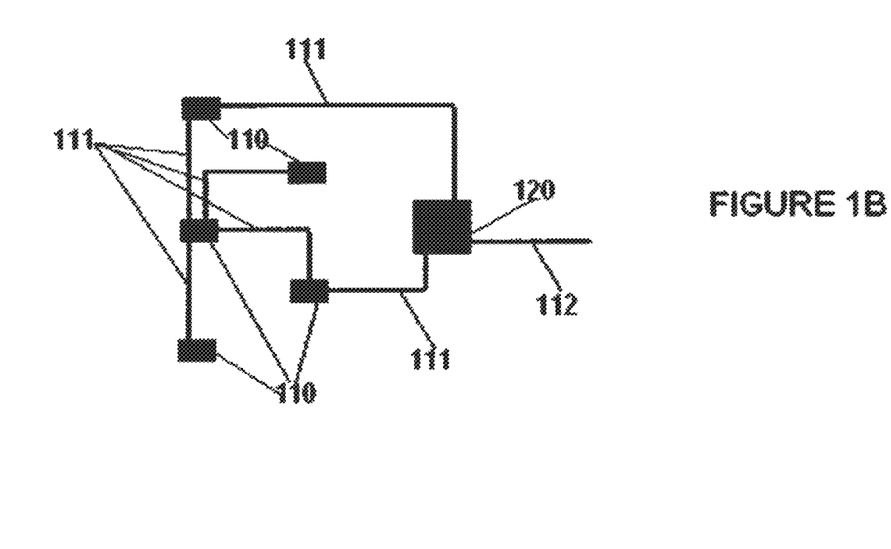

FIG. 1 illustrates two examples of sensor network architectures according to example architectures capable of supporting some embodiments of the invention. In FIGS. 1A and 1B are illustrated networks with five sensors 110. In FIG. 1A each of the five sensors 110 are separately connected to a gateway node 120, by means of connections 111. Gateway node 120 is connected to further nodes, which are not illustrated, by means of connection 112. The architecture of FIG. 1A is useful in cases where the number of sensors 110 is limited and each one can be separately connected to gateway 120, an example is a closed-circuit television monitoring system with a few cameras and a central station with a monitor for each camera. An architecture as illustrated in FIG. 1A may be useful where connections 111 are circuit-switched.

FIG. 1B illustrates a network which, like that of FIG. 1A, comprises five sensors 110. In the network of FIG. 1B, the connections 111 between the sensors 110 and the gateway 120 are arranged in a slightly more complex way, in that some sensors have direct connections to gateway 120 and other sensors 110 are arranged to convey data to gateway 120 via other sensors 110. In other words, a subset of sensors 110 comprises sensors 110 capable of acting as relays. In sensor networks with a larger number of sensors 110 an arrangement as in FIG. 1B may be more useful than that of FIG. 1A as the number of separate connections to gateway 120 can be reduced. A measure of redundancy may also be achieved in that the sensor network may be at least partially resistant to an individual failed connection 111 if data can be routed via an alternate route to gateway 120. An architecture as illustrated in FIG. 1B may be useful where connections 111 are packet-switched.

Connections 111 may be wired connections or alternatively they may be wireless connections. It is possible in some embodiments of the invention, that a sensor network comprises both wired and wireless connections 111. Information may be exchanged over connections 111 using the CoAP protocol, for example, as defined by the Internet Engineering Task Force, IETF. Sensors 110 may be configured to measure at least one, and in some embodiments more than one, physical property depending on the application of the respective embodiment. By physical property it is meant a quantity that can be measured using instrumentation and expressed using a unit system such as the SI, or metric, unit system based on meter, kilogram and second units. Further units, such as Joule, may be expressed in terms of base units such as the aforementioned meter, kilogram and second.

An example of a sensor network is a meteorological sensing network that comprises sensors distributed in known locations measuring temperature, atmospheric pressure and rainfall, for example. Information may be streamed from the sensors in realtime to produce an updated understanding of current weather, and enable weather forecasting using mathematical models that use the output of the sensor network as input. In this case a gateway gathering sensor data may be a function in a data server of a meteorological institute, such as for example the Finnish Meteorological Institute, FMI.

Another example of a sensor network is a personal sensor network comprising, for example, a sensor embedded in a person configured to measure the rate of blood flow in a vein, and another sensor configured to measure a quantity of oxygen in the person's blood. In this case a gateway gathering sensor data may be comprised in a a unit attached to the person's belt, for example, or a unit arranged next to the person's hospital bed, for example. Sensors embedded in a human being may be arranged to be powered by batteries, which may be recharged wirelessly. Such embedded sensors may also be configured to convey their sensor data using a wireless communications technology, such as for example a low-power short-range wireless communications technology, such as for example a Bluetooth low-power short-range wireless technology, for example.

The sensor network of FIG. 1A needn't necessarily have a separate addressing scheme for the sensors. Each sensor being furnished with a dedicated connection 111 to gateway 120, the gateway can gather sensor data and work with it, for example by providing at least part of it to further units, which are not illustrated in FIG. 1A, via connection 112. In FIG. 1B on the other hand, if the sensor network is packet-switched it may benefit from an addressing scheme wherein each sensor 110 has an address unique in the sensor network, and gateway 120 also has an address. Using the addressing scheme, a first sensor not having a direct connection to gateway 120 may output a packet comprising sensor data to the sensor network connections 111 such that the packet comprises information identifying the first sensor as a source of the packet and the intended destination of the packet, which may be gateway 120 or a correspondent node beyond connection 112. When a second sensor receives the packet, it may be configured to observe that the packet has as a destination address the address of gateway 120 or that of a correspondent node beyond gateway 120, responsive to which the second sensor may route the packet toward the destination according to a routing table comprised in the second sensor. The routing table may reflect the topology of the connections 111 in terms sufficient to enable the second sensor to forward packets it receives toward their destinations.

In some embodiments, gateway 120 may assign addresses to sensors 110, wherein the addresses are local in the sense that they have no meaning outside of the sensor network defined by connections 111, in other words connections between sensors 110 and gateway 120. This may be useful as for example internet protocol version 4, IPv4, addresses are globally scarce and it would not be practicable to assign each sensor 110 a globally unique IPv4 address. In fact, where gateway 120 is comprised in a subnetwork in the sense that it doesn't have a globally routable IPv4 address assigned to connection 112, it may even be unpracticable to assign each sensor 110 a locally unique IPv4 address that would be routable in the subnetwork where the address of gateway 120 assigned to connection 112 is assigned. In this sense, gateway 120 may be assigned two addresses, a first address to connection 112 through which the gateway is addressable from outside the sensor network, and a second address to enable sensors 110 comprised in the sensor network to transmit packets to gateway 120 using the connections 111. In this sense, the second address may only have meaning within the sensor network defined by connections 111. Gateway 120 may receive requests for sensor data from the sensor network via connection 112 and the second address, and it may configured to responsively compile sensor data in accordance with the request and provide it via connection 112 to the requesting party. A consequence of local addresses that are not globally unique within links 111 may be that sensors 110 aren't addressable from outside the sensor network. In detail, the sensors may not be addressable from the public Internet, and the sensors may not even be addressable from the subnetwork where gateway 120 is in terms of connection 112.

Gateway 120 may be configured to process sensor data received from sensors 110, for example by deriving contextual sensor data using the sensor data received from sensors 110 and metadata, for example metadata associated with a sensor having produced the sensor data. An example of such a derivation is that gateway 120 receives a video feed from one of more sensor 110 and adds to video frames comprised in the feed time information, or information on a location of each sensor providing the feed or feeds. Gateway 120 may be configured to obtain time and location information from a cellular telephone network or a satellite, for example. Gateway 120 may use, for example, GPS or Galileo or be pre-configured with location information concerning at least one of sensors 110. Another example is that where the sensor network is a medical sensor network, gateway 120 adds a person's name and/or medical information concerning the person to sensor data obtained from sensors 110.

Responsive to receiving a request for contextual sensor data via connection 112, gateway 120 may be configured to obtain metadata pertaining to sensor data from sensors comprised in a sensor network that gateway 120 can access. Obtaining metadata may comprise, for example, obtaining an up-to-date time from a satellite or cellular base station, requesting metadata from a server that gateway 120 can access using connection 112, or obtaining metadata based on sensor data from one or more sensors comprised in the sensor network. For example, where the sensor network comprises sensors moving with a person, one of the sensors may be capable of obtaining a location estimate of the person using satellite positioning, for example. Gateway 120 may prompt this sensor to provide the location estimate, and then add the location estimate, or information derived from the location estimate, to at least one sensor data item obtained from other sensors in the sensor network. In some embodiments, at least one sensor capable of producing metadata is comprised within gateway 120.

More generally, gateway 120 may produce contextual sensor data using metadata obtained from the sensor network, for example a blood pressure reading from a blood pressure sensor comprised in the sensor network may be added to a temperature reading from a body temperature sensor comprised in the sensor network. Contextual sensor data may be more usable than sensor data obtained in an individual sensor. For example, where a heartbeat sensor detects a heart attack, the information concerning the heart attack becomes more actionable when furnished with a location estimate, where an ambulance can be dispatched to. As another example, information that a user isn't engaged in an active telephone call becomes more useful when furnished with information that he is driving a car, and is thus legally unable to receive a phone call. As a yet further example, information from a temperature sensor monitoring a temperature of an industrial process becomes more useful when furnished with information that the process is being intentionally shut down. In the last case, the metadata may render an otherwise alarmingly anomalous temperature reading normal.

In contrast to the limited supply of IPv4 addresses, addresses under the internet protocol version 6, IPv6, are plentiful. Assigning a globally unique IPv6 address to sensors 110 comprised in sensor networks may be possible. In this case, each sensor may be addressable directly from the public Internet.

When each sensor is addressable from outside the sensor network, forming end-to-end connections between the sensors and correspondent nodes may become desirable. In a sense, a correspondent node may subscribe to information from a specific sensor 110, responsive to which the sensor may continuously, periodically or responsive to specific requests received over the end-to-end connection from the correspondent node provide its sensor data to the correspondent node. By end-to-end connection it is meant either a dedicated wire-line connection, or an end-to-end connection in a protocol sense, wherein packets travelling along the end-to-end connection traverse intermediate nodes, which are configured to forward the packets toward their respective destination addresses without interfering with the payloads of the packets unless, in some embodiments, specifically configured to.

The correspondent node may benefit from receiving sensor data from an individual sensor. As discussed above, however, contextual sensor data may be even more usable than sensor data as such, wherefore the correspondent node may benefit even more from receiving contextual sensor data from an individual sensor. In detail, the correspondent node may request sensor data or contextual sensor data from an individual sensor, for example over an end-to-end connection to the individual sensor. In an example process, the correspondent node may first open an end-to-end connection to the sensor, then request sensor data, then receive sensor data, later request contextual sensor data of a first type and yet later request contextual sensor data of a second type. The first and second types of contextual sensor data may correspond to sensor data furnished, or modified, with first and second types of metadata, respectively.

The sensor may be configured to cause the correspondent node to receive contextual sensor data by a number of ways. The sensor itself may be capable of only producing sensor data by performing physical measurements of its surroundings by using inbuilt sensor elements. For example, a temperature sensor would be furnished with a temperature sensor element capable of performing a temperature measurement. The sensor may be configured to request metatata to be provided in order to derive contextual sensor data from its sensor data, or cause the contextual sensor data to be derived based on metadata and the sensor data of the sensor. To that end, the sensor may be configured to transmit a metadata request to gateway 120, for example. Responsive to receiving the metadata request, gateway 120 may be configured to obtain metadata and transmit it to the sensor having transmitted the request. The request from the sensor may comprise as a source address an address of the sensor, allowing gateway 120 to determine which sensor requested the metadata. The metadata request may specify which kind of metadata is requested. In some embodiments, the sensor decides based on a request for contextual sensor data received over the end-to-end connection from the correspondent node, which kind of metadata it requests from the gateway 120 in order to become capable of producing the requested kind of contextual sensor data from the metadata and sensor data.

Gateway 120 may obtain metadata requested by the sensor by generating it itself, by requesting it from a metadata server via connection 112 or by producing it from sensor data received in gateway 120 from sensors in the sensor network other than the sensor requesting the metadata. Gateway 120 may decide how to obtain the requested metadata based on the type of requested metadata.

The metadata request transmitted by the sensor may comprise an indication as to what gateway 120 is requested to do with the requested metadata. For example, instead of transmitting the requested metadata to the requesting sensor, the gateway may be instructed to add the requested metadata to sensor data produced by and transmitted from the requesting sensor as it passes through gateway 120 en route to the correspondent node. This option requires that the end-to-end connection traverses gateway 120, which is necessarily the case where the sensors have no other access to outside networks, than gateway 120. An advantage of this option is that the metadata needn't be transmitted first from gateway 120 to the requesting sensor, and then again from the requesting sensor back through gateway 120 toward the correspondent node.

A further alternative is that gateway 120 is instructed in the metadata request transmitted by the requesting sensor to begin transmitting the requested metadata to the correspondent node, wherein the metadata request comprises an identifier of the correspondent node, such as for example a domain name, an IPv4 address or an IPv6 address. The metadata request in this further alternative may comprise an indication as to how often gateway 120 is requested to send the requested metadata to the correspondent node, for example to continuously stream it, to send it with a periodicity specified in the metadata request, to send it with a default periodicity or to send it only once responsive to the metadata request.

In some embodiments, the correspondent node may transmit to the sensor over the end-to-end connection updates to the original request concerning contextual sensor data. When the sensor receives an update, for example indicating that the correspondent node requests a second type of contextual sensor data instead of a first type requested earlier, the sensor may be configured to transmit an updated metadata request to gateway 120, responsive to which gateway 120 may be configured to modify the metadata it sends to the requesting sensor, adds to a sensor data stream from the requesting sensor or sends to the correspondent node, depending on the embodiment, for example.

Using updates to the original request for contextual sensor data, the correspondent node can increase its awareness of the system being sensed by the sensor. For example, where the original, first kind of contextual sensor data comprised a measured composition of exhaust gases of a commercial ocean transport vessel furnished with metadata identifying the vessel, the correspondent node may responsive to identifying an anomaly in the composition of the exhaust gases request to be provided additionally with a current location of the vessel. This may be useful in case, for example, the measured anomalous composition of the exhaust gases indicates the vessel shouldn't be steered close to densely populated areas. The correspondent node may also be configured to responsively form end-to-end connections to sensors measuring exhaust gases in the entire fleet of the corporation to see if other vessels are also experiencing anomalies. The identity and location of the vessel may be provided by a gateway 120 located in the vessel, for example. Should the correspondent node in this example have requested to be provided with contextual sensor data of the exhaust gases that comprises additionally metadata on the current combustion temperature of the vessel's diesel engine, the gateway 120 of the vessel may have been configured to obtain the requested temperature metadata from a temperature sensor in the diesel engine and to provide it to the requesting exhaust gas sensor, for example.

In general, there is provided an apparatus, such as for example sensor 110 or a control device for inclusion in sensor 110 for controlling the operations of sensor 110. The apparatus may comprise a receiver configured to receive sensor data. For example, the receiver may be a digital or analog input/output communications port, such as for example a serial port, of a control device such as a processor or chipset comprised in sensor 110. The apparatus may also comprise a transmitter configured to transmit sensor data, or data derived at least in part from the sensor data, such as for example contextual sensor data. Where the apparatus is a sensor 110, the transmitter may be a wireless or wired interface to a connection 111 for transmitting toward gateway 120 or to a correspondent node over an end-to-end connection, for example. Where the apparatus is a control device for inclusion in sensor 110, the transmitter may comprise an output pin of a communications port configured to provide data internally in sensor 110 to a wireless or wired interface to a connection 111. The transmitter may further be configured to transmit a metadata request to a first node, which may be for example a gateway 120 or alternatively a separate metadata server, for example.

In some embodiments, the apparatus is a sensor node comprising further at least one sensor element configured to produce the sensor data by physical measurement, and to provide it internally in the apparatus to the receiver. By physical measurement it is meant in this context an instrumented measurement of a physical property such as, for example, temperature, pressure, luminosity, acceleration, distance, magnetic field strength or chemical composition. A physical measurement in this context doesn't refer to a measurement related merely to operating an electronic or optic communications receiver in the sense that the apparatus would receive the sensor data via a communications interface. Instead, the sensor element produces the sensor data by quantifying a physical property external to the sensor element.

In some embodiments, the metadata request comprises a request that metadata be transmitted to the apparatus. In other words, where the apparatus is a sensor 110, the sensor 110 may request to be provided with metadata, for example via link 111.

In some embodiments, the apparatus is configured to, responsive to receiving the requested metadata, derive contextual sensor data from the sensor data and the metadata. The apparatus may further be configured to transmit the contextual sensor data to a second node. Deriving may comprise adding the metadata to the sensor data or otherwise modifying the sensor data based at least in part on the metadata, such that the information content of the sensor data is enhanced by the metadata.

In some embodiments, instead of requesting the metadata to be transmitted to the apparatus, the apparatus in the metadata request implicitly or explicitly requests for the metadata to be transmitted to a second node, which may be for example a correspondent node of the apparatus. In this case, the metadata request may comprise an identifier, such as for example and IPv4 or IPv6 address, or a fully qualified domain name, FQDN, of the second node. The metadata request may also comprise an identifier of the sensor, such as for example an IPv4 or IPv6 address, a medium access control, MAC, address, or any other identifier, which may be furthermore transmitted to the correspondent node alongside of the metadata.

In some embodiments, instead of requesting the metadata to be transmitted to the apparatus or a second node, the apparatus in the metadata request requests that the first node add metadata to sensor data transmitted from the apparatus, or otherwise derive contextual sensor data from the requested metadata and the sensor data of the apparatus. In this case, the metadata request may comprise an indication as to how the apparatus is requesting that the first node produce the contextual sensor data.

In some embodiments, the metadata request comprises an indication as to the type of metadata that is requested. Alternatively, the system may have a default type of metadata, such as for example timestamp, which is used in absence of a specified type.

In some embodiments, the requested type of metadata comprises at least one of time, location, a user identity, a network access point, an active user profile, user activity, speed, and acceleration. Time metadata may comprise a timestamp. Location metadata may comprise, for example, a street address or geographic coordinates indicating a location of the sensor requesting the metadata. A user identity may comprise an identity of a user that the sensor data produced by the requesting sensor relates to, for example due to the requesting sensor being installed on or inside the user, or the sensor being owned by the user. A network access point may be an access point that the requesting sensor or the first node is connected to. A network access point identity may be expressed in terms of access point name, APN, or service set identifier, SSID, for example. An active user profile may be a profile active for a user that the sensor data produced by the requesting sensor relates to. Examples of profiles include silent mode, normal mode and flight mode. Examples of user activity include running and sleeping. Speed metadata may refer to a velocity of the requesting sensor, expressed by a direction and a quantity expressed in meters per second, for example. Acceleration may refer to a rate-of-change of velocity.

In some embodiments, the apparatus is configured to participate in an end-to-end session with a correspondent node. In some embodiments, the correspondent node is the second node. The metadata request may be composed at least in part in dependence of information received in the apparatus from the correspondent node. For example, a metadata type identified implicitly or explicitly in the metadata request may be selected in the apparatus in accordance with a type of contextual sensor data requested by the correspondent node via the end-to-end connection.

In some embodiments, the apparatus is configured to transmit metadata requests periodically, and/or responsive to updated requests for contextual sensor data received over an end-to-end connection to a correspondent node.

Figure 3:
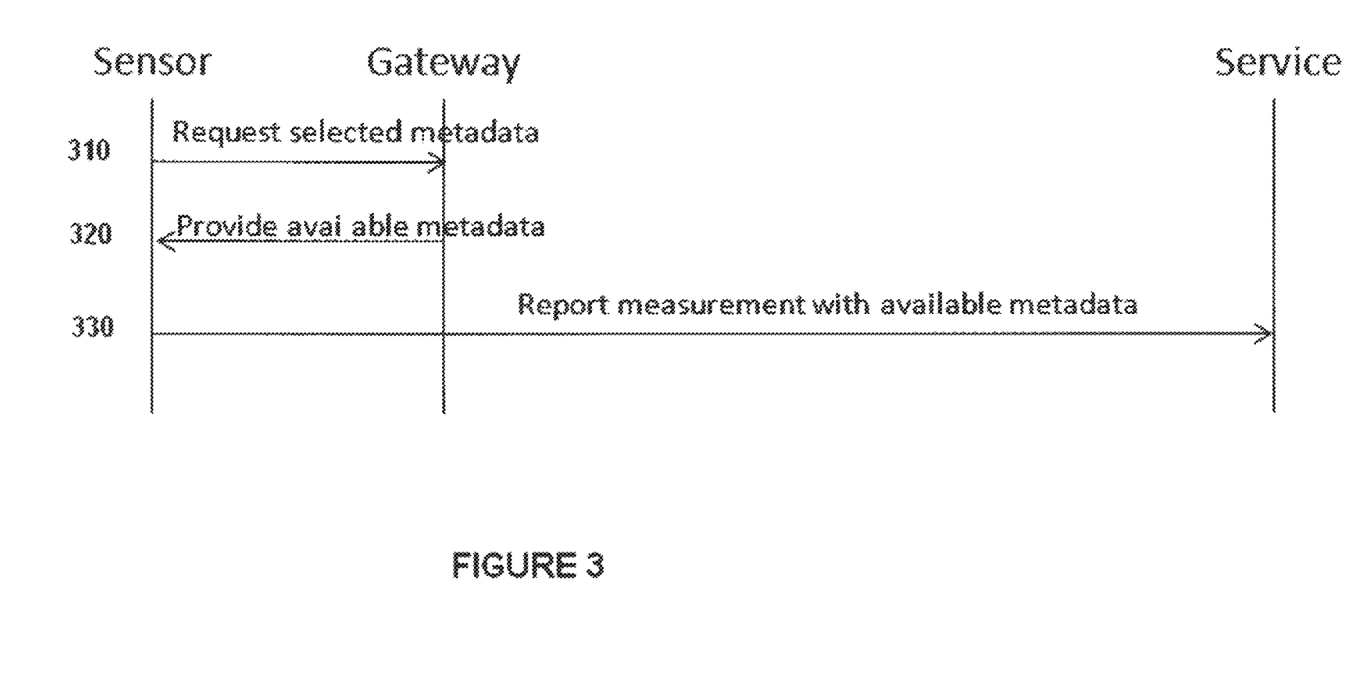
FIG. 3 is a first signaling diagram in accordance with an example embodiment of the invention.

FIG. 3 is a first signaling diagram in accordance with an example embodiment of the invention. In phase 310, a sensor 110 transmits a metadata request to a gateway 120. In phase 320, the gateway responsively provides the requested metadata to sensor 110. In phase 330, sensor 110 provides contextual sensor data to a correspondent node, illustrated in FIG. 3 as a server providing a service. The contextual sensor data provided in phase 330 is derived in sensor 110 from the requested metadata and sensor data obtained locally in sensor 110 by measuring. In some embodiments, the request of phase 310 comprises an event definition defining an event that triggers provision of new metadata from the gateway. The event may be for example availability of updated metadata in the gateway, expiry of a timer or another suitable event.

Figure 4:
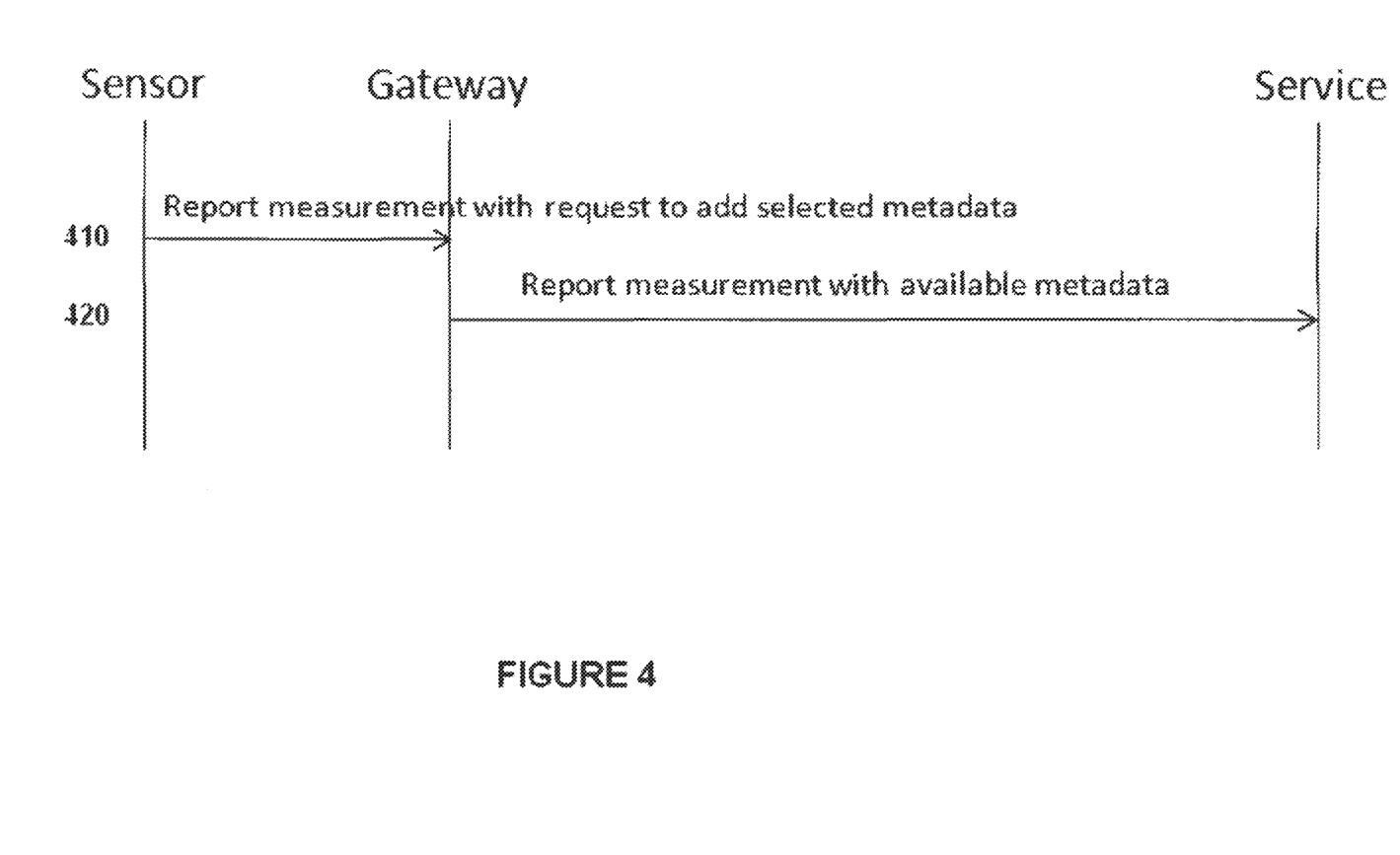
FIG. 4 is a second signaling diagram in accordance with an example embodiment of the invention.

FIG. 4 is a second signaling diagram in accordance with an example embodiment of the invention. In phase 410, a sensor 110 transmits to a gateway 120 sensor data obtained locally in sensor 110 by measuring along with a request to add selected metadata to the sensor data. The sensor data may be transmitted in a separate stream from the request, or alternatively they may be transmitted in a single flow. Responsive to receiving the sensor data and the request, the gateway may be configured to, in phase 420, transmit data to a server providing a service wherein the data is derived from the sensor data and metadata or a type specified in the request of phase 410. The server may be a correspondent node of the sensor. In some embodiments, the request of phase 410 comprises an event definition defining an event that triggers provision of new metadata from the gateway. The event may be for example availability of updated metadata in the gateway, expiry of a timer or another suitable event.

Figure 5:
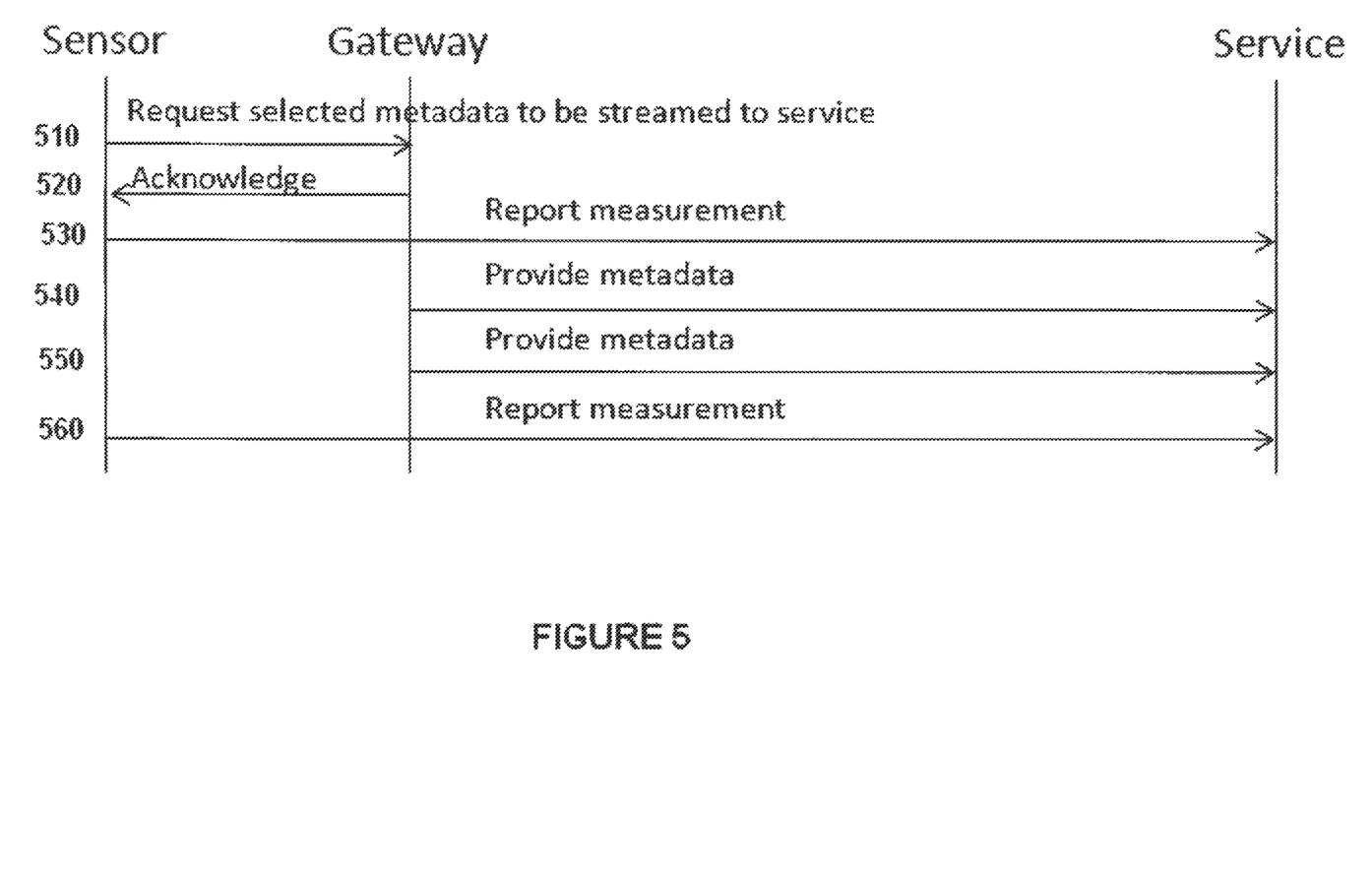
FIG. 5 is a third signaling diagram in accordance with an example embodiment of the invention.

FIG. 5 is a third signaling diagram in accordance with an example embodiment of the invention. In phase 510 a sensor 110 transmits to gateway 120 a request to transmit, for example to stream, metadata to a specified node, wherein an identity or address of the specified node may be provided in the request. The request may also comprise a token for the gateway to include in metadata transmitted from the gateway to the specified node. The token may comprise, for example, an IPv6 address of the sensor, a username and/or medium access control, MAC, address. The sensor may have obtained the token from the specified node via an end-to-end connection interconnecting the sensor and the specified node. In phase 520, the gateway may optionally acknowledge receipt of the request to the sensor, in other words phase 520 is optional. In phase 530, the sensor may begin reporting sensor data obtained locally by measurement in the sensor to the specified node, for example via the end-to-end connection. In phases 540 and 550, which may occur concurrently with phase 530, the gateway may begin transmitting the requested metadata to the specified node. Where the sensor has provided a token to the gateway in phase 510, the gateway may be configured to include the token along with the metadata transmitted in phases 540 and 550. The specified node, illustrated as "Service" in FIG. 5, being in receipt of the sensor data from the sensor, the metadata from the gateway and the token from the gateway, may associate the sensor data and the metadata by using the token it had previously provided to the sensor via the end-to-end connection, for example. Using the metadata and the sensor data, the specified node may derive contextual sensor data. When the specified node only requests one contextual sensor data stream from one sensor, there is no need to use a token as the sensor data and metadata can be easily associated with each other in the specified node even without using a token. The request of phase 510 may specify a type of metadata to be sent to the specified node, the type optionally being chosen by the specified node and the chosen type communicated to the sensor via the end-to-end connection. In some embodiments, the request of phase 310 comprises an event definition defining an event that triggers provision of new metadata from the gateway. The event may be for example availability of updated metadata in the gateway, expiry of a timer or another suitable event. In this sense, phase 550 may occur responsive to the specified event occurring in the gateway.

Figure 2:
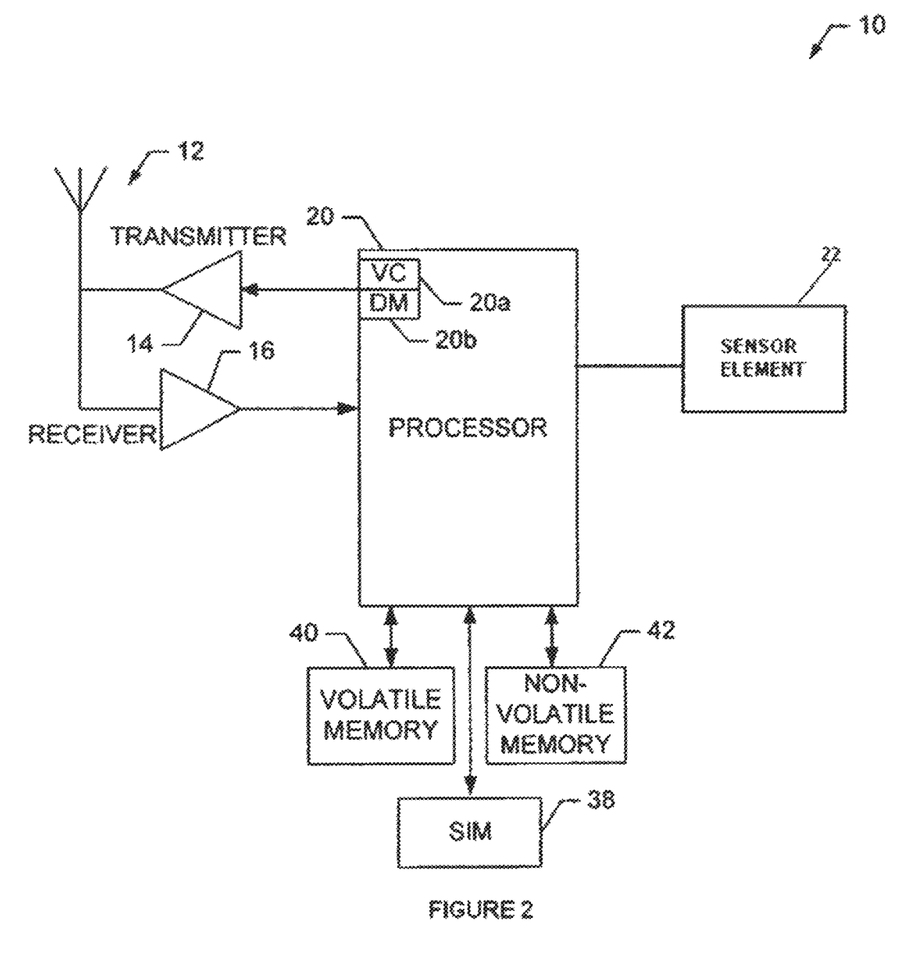
FIG. 2 illustrates a block diagram of an apparatus in accordance with an example embodiment of the invention.

FIG. 2 illustrates a block diagram of an apparatus 10 such as, for example, a sensor 110, in accordance with an example embodiment of the invention. While several features of the apparatus are illustrated and will be hereinafter described for purposes of example, other types of electronic devices may employ various embodiments of the invention.

As shown, the apparatus 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. The transmitter 14 and receiver 16 may connect apparatus 10 to connections 111 of FIG. 1. Although illustrated as wireless with antenna, in some embodiments connections 111 of FIG. 1 are wire-line connections and in those embodiments the interface to such connections 111 is a wire-line communication interface and not a wireless transmitter and receiver. Likewise processor 20 may be configured to control other elements of apparatus 10 by effecting control signaling via electrical leads connecting processor 20 to the other elements, such as for example a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system or non-cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include sensor data, forwarded or routed packets, and/or the like. In this regard, the apparatus may be capable of operating with one or more air interface standards, communication protocols, modulation types, access types, and/or the like. Other examples of radio technologies the apparatus may be capable of communicating with include Bluetooth low-energy, BT-LE, IEEE 802.15.4, Z-Wave, ANT, Dash7, Wave2M and low-power variants of IEEE 801.11 which is also known as W-Fi or any cellular radios designed for machine-to-machine, M2M, communications.

It is understood that the processor 20 may comprise circuitry for implementing logic functions of apparatus 10. For example, the processor 20 may comprise a digital signal processor device, a microprocessor device, an analog-to-digital converter, a digital-to-analog converter, and/or the like. Control and signal processing functions of the apparatus may be allocated between these devices according to their respective capabilities. The processor may additionally comprise an internal data coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a communication program. The connectivity program may allow the mobile terminal 10 to transmit and receive content, such as sensor and/or metadata content, according to a protocol, such as wireless application protocol, WAP, hypertext transfer protocol, HTTP, Constrained Application Protocol, CoAP, a BT-LE profile, and/or the like Although not shown, the apparatus may comprise a battery for powering various circuits related to the mobile terminal, for example, a circuit to provide mechanical vibration as a detectable output.

As shown in FIG. 2, apparatus 10 may also include one or more means for sharing and/or obtaining data. For example, the apparatus may comprise at least one sensor element 22. A sensor element may be configured to produce sensor data, or data for sensor data, by instrumented measurement, for example where sensor 22 is an atmospheric pressure sensor, it may be enabled to produce data indicative of prevailing atmospheric pressure. Apparatus 10 may comprise more than one sensor element 22, wherein each sensor element 22 may be configured to measure a different physical property.

The apparatus 10 may comprise memory, such as a subscriber identity module, SIM, 38, a removable user identity module, R-UIM, and/or the like, which may store information elements related to a mobile subscriber. In addition or alternatively to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10, or a MAC address of the apparatus.

Without in any way limiting the scope, interpretation, or application of the claims appearing below, a technical effect of one or more of the example embodiments disclosed herein is that end-to-end communication directly to sensor nodes comprised in sensor networks is enabled, allowing also contextual sensor data to be accessed directly from the sensor. Another technical effect of one or more of the example embodiments disclosed herein is that provision and handling of contextual sensor data streams is made more dynamic. Yet another technical effect is that individual sensor nodes are enabled to utilize services of a gateway in a standardized way.

Embodiments of the present invention may be implemented in software, hardware, application logic or a combination of software, hardware and application logic. The software, application logic and/or hardware may reside on memory 40, 42, the processor 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. A sensor apparatus, comprising:
a receiver configured to receive sensor data and, using IPv6 addressing, from a correspondent node, a request to subscribe to information of the sensor apparatus; and a transmitter configured to cause the sensor data, or data derived at least in part from the sensor data, to be transmitted to the correspondent node, wherein the transmitter is further configured to transmit a metadata request, distinct from the sensor data, to a first node distinct from the correspondent node and distinct from the sensor apparatus, wherein the metadata request comprises a request that the first node add metadata to the sensor data transmitted from the sensor apparatus and wherein the metadata request does not comprise the requested metadata.

2. The sensor apparatus according to claim 1, wherein the sensor apparatus comprises at least one sensor element configured to produce the sensor data by physical measurement and to provide it to the receiver internally in the sensor apparatus.

3. The sensor apparatus according to claim 1, wherein the metadata request comprises a request that metadata be transmitted to the sensor apparatus.

4. The sensor apparatus according to claim 3, wherein the sensor apparatus is configured to derive contextual sensor data from the sensor data and the metadata, and to cause the contextual sensor data to be transmitted to a second node.

5. The sensor apparatus according to claim 1, wherein the metadata request comprises a request that metadata be transmitted to a second node.

6. The sensor apparatus according to claim 1, wherein the metadata request comprises an indicator specifying what kind of metadata the metadata request relates to.

7. The sensor apparatus according to claim 6, wherein the indicator specifies that the metadata request is a request for at least one of time, geo-location, user identity, a network access point, an active user profile, user activity, speed and acceleration metadata.

8. The sensor apparatus according to claim 1, wherein the sensor apparatus is further configured to participate in an end-to-end session with a correspondent node of the sensor apparatus.

9. The sensor apparatus according to claim 8, wherein the metadata request is composed in the sensor apparatus at least in part in dependence of information received in the sensor apparatus from the correspondent node.

10. The sensor apparatus according to claim 1, wherein the transmitter is configured to transmit metadata requests periodically.

11. The sensor apparatus according to claim 1, wherein the sensor apparatus comprises a mobile communication device, the apparatus further comprising an antenna operatively coupled to the transmitter.

12. A method, comprising:

receiving sensor data in a sensor apparatus and, using IPv6 addressing, from a correspondent node, a request to subscribe to information of the sensor apparatus;

transmitting, from the sensor apparatus, the sensor data, or data derived at least in part from the sensor data to the correspondent node, and transmitting, from the sensor apparatus, a metadata request, distinct from the sensor data, to a first node distinct from the correspondent node and distinct from the sensor apparatus, wherein the metadata request comprises a request that the first node add metadata to the sensor data transmitted from the sensor apparatus and wherein the metadata request does not comprise the requested metadata.

13. The method according to claim 12, further comprising producing the sensor data by physical measurement in the apparatus and providing it to the receiver internally in the sensor apparatus.

14. The method according to claim 12, wherein the metadata request comprises a request that metadata be transmitted to the sensor apparatus.

15. The method according to claim 14, comprising deriving contextual sensor data from the sensor data and the metadata, and causing the contextual sensor data to be transmitted to a second node.

16. The method according to claim 12, wherein the metadata request comprises a request that metadata be transmitted to a second node.

17. The method according to claim 12, wherein the metadata request comprises an indicator specifying what kind of metadata the metadata request relates to.

18. The method according to claim 17, wherein the indicator specifies that the metadata request is a request for at least one of timestamp or geo-location metadata.

19. A sensor apparatus, comprising:

a receiver configured to receive sensor data and, using IPv6 addressing, from a correspondent node, a request to subscribe to information of the sensor apparatus; and a transmitter configured to cause the sensor data, or data derived at least in part from the sensor data, to be transmitted to the correspondent node, wherein the transmitter is further configured to transmit a metadata request, distinct from the sensor data, to a first node distinct from the correspondent node and distinct from the sensor apparatus, wherein the metadata request comprises a request that metadata be transmitted to the correspondent node, and wherein the metadata request does not comprise the requested metadata.

20. The sensor apparatus according to claim 19, wherein the metadata request comprises an indicator specifying what kind of metadata the metadata request relates to.

* * * * *